United States Patent [19]

Ross

[11] Patent Number: 5,692,006
[45] Date of Patent: Nov. 25, 1997

[54] ADAPTIVE DESPREADER

[75] Inventor: Arthur Ross, Phoenix, Ariz.

[73] Assignee: QUALCOMM Incorporated, San Diego, Calif.

[21] Appl. No.: 509,722

[22] Filed: Jul. 31, 1995

[51] Int. Cl.$^6$ .................................................. H04B 15/00
[52] U.S. Cl. ....................... 375/200; 364/724.16; 371/21; 371/30; 371/41
[58] Field of Search ....................... 375/200, 205, 375/206, 207, 232, 262, 267, 341, 343; 371/21, 30, 41; 364/724.16

[56] References Cited

U.S. PATENT DOCUMENTS

| | | | |
|---|---|---|---|
| 5,359,624 | 10/1994 | Lee et al. ................................. | 375/205 |
| 5,422,908 | 6/1995 | Schilling .................................. | 375/203 |
| 5,533,012 | 7/1996 | Fukasawa et al. .................... | 370/18 |
| 5,594,754 | 1/1997 | Dohi et al. .............................. | 375/200 |
| 5,596,600 | 1/1997 | Dimos et al. ........................... | 375/206 |

*Primary Examiner*—Wellington Chin
*Assistant Examiner*—Congvan Tran
*Attorney, Agent, or Firm*—Russell B. Miller; Sean English

[57] ABSTRACT

A method and apparatus for adaptively despreading a direct sequence spread spectrum signal. The direct sequence spread spectrum signal is provided to a transversal filter. The output of the filter is demodulated to provide a soft symbol. The soft symbol is provided to an error corrector which generates an error corrected version of the soft symbol, referred to as a hard symbol. The value of the hard symbol is subtracted from the soft symbol to generate an error symbol. The error symbol is then used to compute tap values of the transversal filter by an LMS algorithm.

23 Claims, 1 Drawing Sheet

ADAPTIVE DESPREADER

BACKGROUND OF THE INVENTION

I. Field of the Invention

The present invention relates to communication systems. More particularly, the present invention relates to a novel and improved method and apparatus for enhancing the performance of direct sequence spread spectrum receivers in the presence of unresolved multipath fading.

II. Description of the Related Art

Communication systems have been developed to allow transmission of information signals from a source location to a physically distinct user destination. Both analog and digital methods have been used to transmit such information signals over communication channels linking the source and user locations. Digital methods tend to afford several advantages relative to analog techniques, including, for example, improved immunity to channel noise and interference, increased capacity, and improved security of communication through the use of encryption.

In transmitting an information signal from a source location over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the user location, the original message signal is replicated from a version of the modulated carrier received subsequent to propagation over the channel. Such replication is generally achieved by using an inverse of the modulation process employed by the source transmitter.

Modulation also facilitates multiple-access, i.e., the simultaneous transmission of several signals over a common channel. Multiple-access communication systems will often include a plurality of remote subscriber units requiring intermittent service of relatively short duration rather than continuous access to the communication channel. Systems designed to enable communication over brief periods of time with a set of subscriber units have been termed multiple access communication systems.

A particular type of multiple access communication system is known as a spread spectrum system. In spread spectrum systems, the modulation technique utilized results in a spreading of the transmitted signal over a wide frequency band within the communication channel. One type of multiple access spread spectrum system is a code division multiple access (CDMA) modulation system. Other multiple access communication system techniques, such as time division multiple access (TDMA), frequency division multiple access (FDMA) and AM modulation schemes such as amplitude companded single sideband are known in the art.

However, CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both are assigned to the assignee of the present invention, and both are incorporated by reference herein.

In a CDMA cellular telephone system, the same frequency band is used for communication in all cells. The CDMA waveform properties that provide processing gain are also used to discriminate between signals that occupy the same frequency band. Furthermore, the high speed pseudonoise (PN) modulation allows many different propagation paths to be separate, provided the difference in pathways exceed the PN chip duration, or one/bandwidth. If a PN chip rate of 1 MHz is employed, multiple path demodulation can be employed against paths that differ by more than one microsecond in path delay from the desired path. A one microsecond path delay differential corresponds to differential path distance of 1,000 feet. The urban environment typically provides differential path delays in excess of one microsecond, and up to 10–20 microseconds are reported in some areas.

In narrow band modulation systems, such as the analog FM modulation employed by conventional cellular telephone systems, the existence of multiple paths can result in severe fading characteristics. With wide band CDMA modulation, however, the different paths may be discriminated in the demodulation process. This discrimination greatly reduces the severity of multipath fading. Multipath fading is not totally eliminated in using CDMA discrimination techniques, because there will occasionally exist paths with delayed differentials of less than the minimum path delay for the particular system. Signals having path delays on this order cannot be discriminated against in the demodulator. It is, therefore, desirable that some form of diversity exist which would permit a system to be utilized in order to further reduce the effects of fading.

The deleterious effects of fading can be controlled somewhat by controlling transmitter power in the CDMA system. A system for cell-site and mobile unit power control is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the Assignee of the present invention and incorporated by reference herein. Furthermore, the effect of multipath fading can be reduced in the hand-off mode when the mobile unit is transitioning between cell-site service area with the mobile unit communicating cell-sites during the hand-off process. The hand-off scheme is disclosed in U.S. Pat. No. 5,101,501, entitled "SOFT HANDOFF IN A CDMA CELLULAR TELEPHONE SYSTEM", assigned to the assignee of the present invention and incorporated by reference herein.

The existence of multipaths can provide path diversity to a wideband CDMA system. If two or more paths are available with greater than one microsecond differential path delay, two or more receivers can be employed to separately receive the signals. Since these signals will typically exhibit independence in multipath fading (i.e., they usually do not fade together), the outputs of the two receivers can be diversity combined. A method and apparatus for implementing a combining receiver of this sort is described in detail in U.S. Pat. No. 5,109,390, entitled "DIVERSITY RECEIVER IN A CDMA CELLULAR TELEPHONE SYSTEM", assigned to the assignee of the present invention and incorporated by reference herein.

SUMMARY OF THE INVENTION

The present invention is a novel and improved method and apparatus for enhancing the performance of direct sequence spread spectrum receivers in the presence of unresolved multipath fading. The present invention is an alternative to the diversity receiver structure, described in the aforementioned U.S. Pat. No. 5,101,501, for direct sequence spread spectrum receivers. The present invention is similar in function to the diversity receiver, but it has the advantages of simplicity and improved performance in the presence of unresolved multipath. It is also more appropriate for high data rate systems, which may be desirable in indoor applications. Its novelty lies in the incorporation of a despreading and re-spreading operation within a traditional adaptive equalizer.

The multipath propagation channels found in indoor environments in the 800 to 2000 MHz range typically have rather short delay spreads. The spread can range from approximately 20 ns to 300 ns depending on the size of the building, the nature and design of the walls, and other factors. The diversity receivers that are used for direct sequence reception in the cellular outdoor environment are most effective when the delays between multipath components are large compared to a spreading sequence chip. In the standardized CDMA design, as described in detail in the aforementioned U.S. Pat. Nos. 4,901,307 and 5,103,459, the chip duration is approximately 800 ns long. The long chip duration relative to the delay spread means that only one demodulated signal of the diversity receiver will be useful. Moreover, the unresolved multipath will lead to flat Rayleigh fading of the output from that one demodulated signal of the diversity receiver. Thus, the diversity receiver gain that is possible with longer delays is not achieved.

The short delay spread indoors suggests that a novel method for handling the multipath signal is necessary. The present invention utilizes an equalizer like structure to achieve this goal. The purpose of the present invention is to reduce intersymbol interference, which arises from multipath propagation. Equalizers using the classic least means squares (LMS) algorithm normally use feedback based on individual symbol decisions to update tap weights of a transversal filter. The LMS algorithm estimates the inverse gradient of an error function with respect to the tap weights, and adjusts the tap weights in a direction opposite to the estimated gradient. Under reasonable conditions of channel statistics and gain the filter converges to a state that is effective in mitigating the intersymbol interference. The LMS algorithm is widely used because of its simplicity, ease of computation, and the fact that it needs no repetition of the data. However, in the present application, the LMS algorithm is not directly applicable because of the direct sequence spreading.

In the CDMA cellular and PCS systems, the multipath spread introduces intersymbol interference not at the symbol time scale (tens of microseconds), but rather at the chip time scale (tens to hundreds of nanoseconds). Therefore, the adaptive equalizer of the present invention functions with feedback of chip-by-chip errors. In order to do this, the data modulation must be estimated from the despread signal, the error estimated, and the difference between soft and hard decisions re-spread by the original pseudonoise sequence before being fed back as a tap weight correction.

The exemplary implementation of the present invention is used in demodulating a pilot channel. A pilot channel is channel used to provide basic timing synchronization information and carries no data. The use and implementation of a pilot channel is described in detail in the aforementioned U.S. Pat. No. 5,103,459. The present invention can be use in demodulating other information channels with minor modifications.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
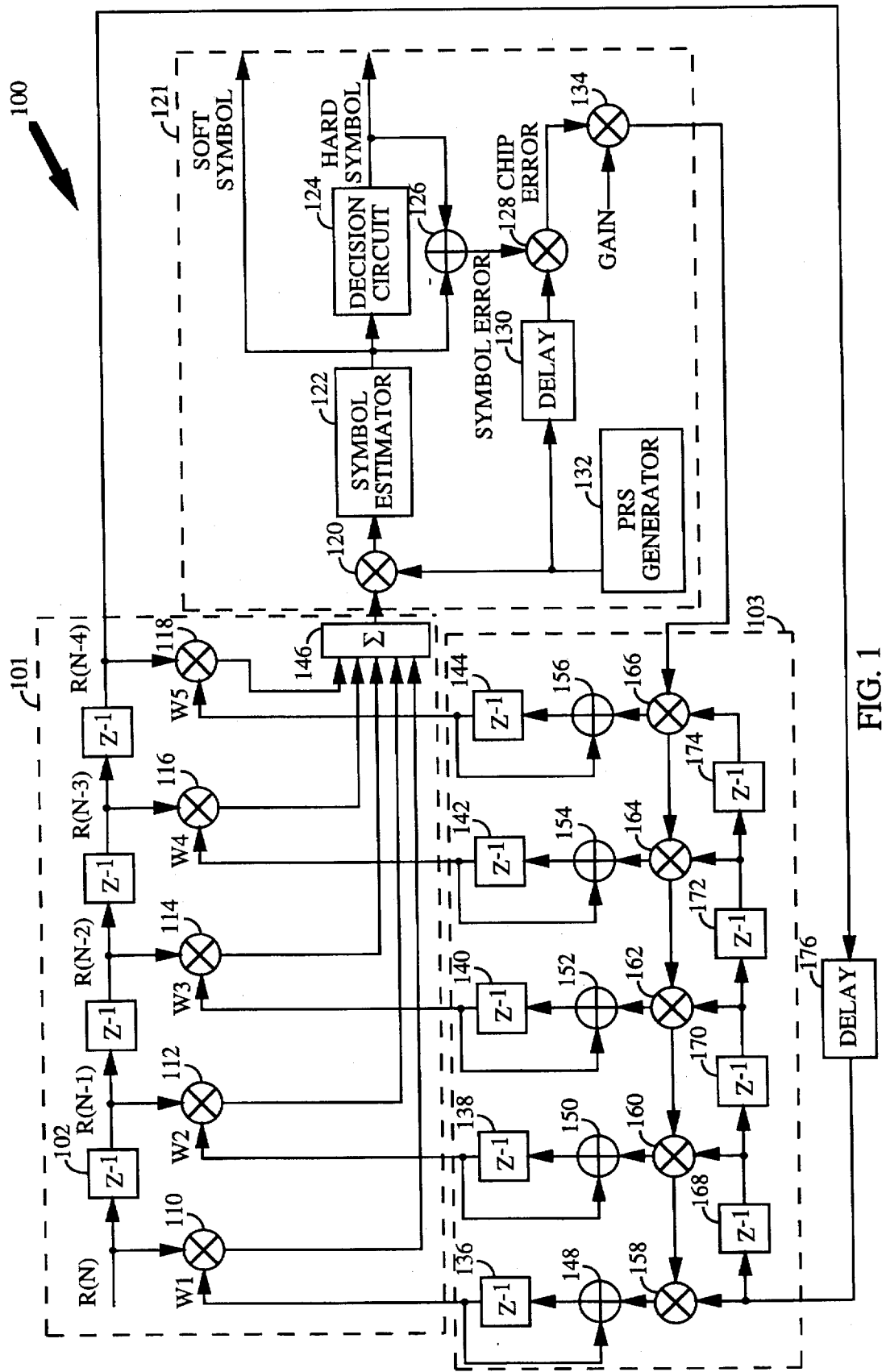
FIG. 1 is a block diagram of the present invention.

FIG. 1 shows the novel adaptive despreader structure which permits equalization of the broadband channel. Not illustrated in FIG. 1 is a receiver which down converts in frequency the spread spectrum signal and converts it to a digital baseband signal as is well known in the art. The adaptive despreader 100 is comprised of: transversal filter 101, least means squares (LMS) tap updating circuit 103 and symbol estimation, despreading and respreading circuitry 121. Adaptive despreader 100 is illustrated as comprised of discrete elements. In the exemplary embodiment, adaptive despreader 100 is implemented in a microprocessor or micro-controller programmed to perform the functions described. Though FIG. 1 does not illustrate a separate timing block it should be noted that such clock timing is typically provided within a microprocessor or micro-controller or could be provided by an independent timing source.

Transversal filter 101 is a finite impulse response (FIR) filter which receives the digital signal R, representative of a baseband version of the spread spectrum signal. Transversal filter 101 generates a filtered signal based upon the most recently received sample $R(n)$, and previously received samples $R(n)$, $R(n-1)$, $R(n-2)$, $R(n-3)$ and $R(n-4)$. The structure shown in FIG. 1 has five taps. That is the filtered value, $S(n)$ is based upon five received values $R(n)$, and previously received samples $R(n)$, $R(n-1)$, $R(n-2)$, $R(n-3)$ and $R(n-4)$ provided to summing element 146. Although, in the exemplary embodiment, the structure shown is a five tap FIR filter, any number of taps may be used consistent with performance requirements.

The received signal is provided to a series of delay elements 102, 104, 106 and 108. In a spread spectrum communication system the smallest piece of transmitted information is referred to as a chip. Each chip has a predetermined chip period. Each of delay elements 102, 104, 106 and 108 delay the received chip by a value equal to the sampling period of the signal. In the exemplary embodiment, the input sampling rate is a small integer multiple of the chip rate. For example a chip rate of 1.25 MHz, the integer multiple could be 4 with a corresponding sampling rate of 5 MHz. Delay elements 102, 104, 106 and 108 may be implemented using latches or other memory elements which are well known in the art.

The current sample $R(n)$ and output of each of delay elements 102, 104, 106 and 108 are respectively provided to multipliers 110, 112, 114, 116 and 118. In multipliers 110, 112, 114, 116 and 118, the sample values are weighted by weighting tap values $w_1, w_2, w_3, w_4$ and $w_5$, respectively, which are computed by LMS tap updating circuit 103, described later herein. Each of the weighted sample values are provided to summer ($\Sigma$) 146. Summer 146 sums each of the weighted sample values to generate the output value, $S_n$. Summer 146 outputs the filtered values $S_n$ at the chip rate, that is one per chip period.

The output chip from transversal filter 101, $S_n$, is provided to symbol estimation, despreading and re-spreading circuitry 121. The output chip, $S_n$ is provided to multiplier 120. In multiplier 120 the input filtered chips $S_n$ are multiplied by binary digits of a pseudo random sequence provided by pseudo random sequence (PRS) generator 132 at the chip rate. The product of multiplier 120 is provided to symbol estimator 122. Symbol estimator 122 integrates the results of the outputs from multiplier 120 over a symbol period, which is greater than the chip period, in order to generate the despread symbol. Symbol estimator 122 may be formed from a digital integrator well known in the art. Symbol estimator 122 may also provide a symbol mapping, where the integrated chip values provide a first symbol estimate which maps into soft symbol by a predetermined mapping. A typical mapping is the Hadamard transform mapping.

If the spreading is bipolar phase shift keyed (BPSK), then the despreading sequence should be bipolar (±1) valued, identical to the spreading sequence used at the transmitter. If the spreading is quadrature phase shift keyed (QPSK), then generally its I and Q components should each be bipolar valued, and the despreading sequence is the complex conjugate of the spreading sequence used by the transmitter. In the exemplary embodiment, PRS generator 132 is implemented using a shift register, the design and implementation of which is well known in the art.

The despreading operation yields a low-pass signal component corresponding to the data modulation present in the original transmitted signal of interest. Interference from other stations will not be compressed by the pseudonoise multiplication and will remain a wideband waveform as is described in detail in the aforementioned U.S. Pat. Nos. 4,901,307 and 5,103,459.

Symbol estimator 122 operates on the output of summer 146. Symbol estimator 122 filters or otherwise processes the samples from transversal filter 101 and generates an estimate of the modulation symbol which was transmitted during each symbol period. Normally, a large number of chips affect each symbol, reflecting the large ratio of spreading bandwidth to data rate. This symbol estimator output is labeled 'soft symbol' in FIG. 1.

The soft symbols are further processed by decision circuit 124. The output of decision circuit 124 is a complex value which is a reconstruction of the original transmitted modulation symbol. In the case of demodulating a pilot signal, that symbol is represented by a single complex number, such as 1+0j. In the case of demodulating a pilot signal, decision circuit 124 is a comparator where the integrated chip values provided by symbol estimator 122 are compared to a constant. This implementation of decision circuit 124 is useful in generating an unmodulated pilot estimate. On the other hand, decision circuit 124 may be a complex circuit such as a Viterbi decoder which supplies re-encoded channel symbols as a result of its final decisions.

An error waveform is calculated as the difference between the soft decision symbol provided by symbol estimator 122 and the hard decision symbol provided by decision circuit 124 in summer 146. This complex error, e(n), is re-spread in multiplier 128 by a pseudo-random sequence provided by PRS generator 132 which is delayed by delay element 130. Delay element 130 may be configured from a latch or memory element known in the art.

Tap weight updates are computed in accordance with the LMS algorithm in LMS tap updating circuit 103. The original spread signal samples must be used, not the modulation symbols. This differs from the traditional LMS adaptive equalizer in that the signal is despread for symbol decision making, and re-spread for tap updating.

The structure of decision circuit 124 can have different implementations depending on its application. IN the exemplary embodiment, where a substantial portion of the forward link power is devoted to a spread but otherwise unmodulated pilot, the transmitted symbol is known a priori to be a constant. So the output of decision circuit 124 does not depend on the received signal at all, but is simply a constant, such as 1+j0. Thus, the soft symbols are short term averages of the despreader output, and the symbol errors are differences between those short term averages and the constant target.

The symbol decisions are based on the values of many chips. They are, therefore, not available until some time after the last chip from which they are comprised. Because of this delay, the received signal, R(n), must be delayed before being provided to LMS tap updating circuit 103 and the pseudo random sequence must be delayed before being provided to multiplier 128. Delay element 130 delays the pseudo random sequence and delay element 176 provides the delay for the received signal, R(n). Those delays are at least one data symbol in length. The delays will be several symbols if Viterbi decoder side information is used, since final symbol decisions lag receipt by at least the truncation length of the decoder.

The delays shown in FIG. 1 are there to bring the decision error feedback into time alignment with the channel samples. They are, therefore, approximately one symbol in duration. Typical symbol periods are 52.1 μs. On the forward link and 208.3 μs on the reverse link. The spreading code delay need remember only two bits per chip, or 128 and 512 bits. Thus, the signal samples, at 8× oversampling and 4 bits for I and Q would need 8192 and 32768 bits, respectively.

In a system with code rate ρ, m-ary modulation, and data rate R, the symbol period is given by:

$$T_{symb} = \frac{\rho \cdot \log_2 m}{R} \tag{1}$$

So the delay in terms of samples are computed as:

$$T_{symb} \cdot f_{chip} = \frac{\rho \cdot \log_2 m \cdot f_{chip} \cdot S}{R}, \tag{2}$$

where S is the oversampling ratio for the signal.

One can compute the number of taps needed in transversal filter 101 in terms of the total delay span of the multipath signals. Thus, if the delay span is set at 200 nanoseconds, then at this sampling rate of 20 MHz the number of taps can be computed as:

$$200 \text{ ns} \cdot 20 \text{ MHz} + 1 \geq 5 \text{ taps} \tag{3}$$

will be necessary.

The success of this scheme depends on the adaptation speed being fast enough to follow the short term changes in apparent multipath, mostly due to motion of the handset. For a handheld unit the rate of change at 1800 MHz and 3 m/s (6.7 mph) can be estimated to be about 2fv/c=36 nulls/sec, or about 28 ms between nulls. This suggests that the adaptation time should be no more than a few hundred microseconds for the scheme to be successful. At vehicular speeds the time is reduced by about a factor of 10, or about 2.8 ms.

A fixed gain is shown multiplying the error signal in multiplier 134 before it is provided back to LMS tap updating circuit 103. This gain must be appropriately chosen, since it may cause slow convergence if it is too small, and causes instability if it is too large.

LMS tap updating circuit 103 receives the weighted error signal from multiplier 134 and the delayed samples from delay element 176. The delayed samples from delay element 176 are provided to a series of delay elements 168, 170, 172 and 174. Delay elements 168, 170, 172 and 174 each delay the received sample by an additional sample period as described in relation to delay elements 102, 104, 106 and 108.

The outputs from delay elements 176, 168, 170, 172 and 174 are provided to multipliers 158, 160, 162, 164 and 166, respectively. The output of multipliers 158, 160, 162, 164 and 166 are provided to a first input of summers 148, 150, 152, 154 and 156, respectively. The outputs from summing elements 148, 150, 152, 154 and 156 are provided to delay elements 136, 138, 140, 142 and 144. The second input to summers 148, 150, 152, 154 and 156 is a single sample delayed output of each of the respective summers 136, 138, 140, 142 and 144. Delay elements 136, 138, 140, 142 and 144 delay the input sample by a single sampling period. The outputs from delay elements 136, 138, 140, 142 and 144 are provided as the tap values to transversal filter 101 as provided to multipliers 110, 112, 114, 116 and 118, respectively.

This structure is simpler than a diversity receiver. Only one demodulator is needed, in contrast to multiple demodulators in the diversity receiver. There is also no need to search for multipath signals and to assign demodulation elements to the multipath signals, since the tap locations are fixed at regular intervals. Because there is no dynamic assignment, there is no loss due to assignment errors. Since there is only one soft decision output, there is no need for de-skewing. At comparable levels of complexity more taps may be used, possibly leading to better diversity gain.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An adaptive despreader comprising:
    transversal filter means for receiving input samples and for filtering said input samples in accordance with a set of adaptive filter tap values to provide filtered chip values wherein said adaptive tap values are updated in accordance with a re-spread error signal;
    de-spreading means for receiving said filtered chip values and de-spreading said filtered chip values in accordance with a direct sequence spread spectrum format to provide a first estimated symbol and for generating a second estimated symbol in accordance with a predetermined decision format;
    error calculator means for receiving said first estimated signal and said second estimated signal and for generating an error signal in accordance with said first estimated signal and said second estimated signal;
    spreading means for receiving said error signal and for spread spectrum spreading said error signal in accordance with a predetermined spread spectrum format to provide said re-spread error signal.

2. The apparatus of claim 1 wherein said transversal filter means is an finite impulse response (FIR) filter.

3. The apparatus of claim 1 wherein said de-spreading means comprises:
    symbol estimator means for generating a first symbol estimate in accordance with said filtered chip values; and
    hard decision means for generating a hard symbol estimate in accordance with said first symbol estimate in accordance with a predetermined hard decision format.

4. The apparatus of claim 3 wherein said hard decision means comprises a comparator circuit.

5. The apparatus of claim 3 wherein said hard decision means comprises a Viterbi decoder.

6. The apparatus of claim 3 wherein said de-spreading means further comprises:
    pseudo random sequence generator means for generating a pseudo random sequence; and
    multiplier means for receiving said multiplying said filtered chip values and for receiving said pseudo random sequence and for multiplying said filtered chip values by said pseudo random sequence to provide a product sequence.

7. The apparatus of claim 1 wherein said transversal filter means updates said tap values in accordance with a least means square (LMS) tap adaptation format.

8. The apparatus of claim 6 wherein said symbol estimator is for integrating said product sequence to provide a de-spread sequence.

9. The apparatus of claim 8 wherein said symbol estimator means is further for mapping said de-spread sequence to a second sequence according to a predetermined mapping format.

10. The apparatus of claim 9 wherein said mapping format is a Hadamard transform.

11. A method for adaptively despreading a spread spectrum signal comprising the steps of:
    receiving input samples;
    filtering said input samples in accordance with a set of adaptive filter tap values to provide filtered chip values wherein said adaptive tap values are updated in accordance with a re-spread error signal;
    de-spreading said filtered chip values in accordance with a direct sequence spread spectrum format to provide a first estimated symbol;
    generating a second estimated symbol in accordance with a predetermined decision format;
    generating an error signal in accordance with said first estimated signal and said second estimated signal; and
    spreading said error signal in accordance with a predetermined spread spectrum format to provide said re-spread error signal.

12. The method of claim 11 wherein said step of filtering comprises finite impulse response (FIR) filtering said input samples.

13. The method of claim 11 wherein said step of de-spreading said filtered chip values comprises:
    generating a first symbol estimate in accordance with said filtered chip values; and
    generating a hard symbol estimate in accordance with said first symbol estimate in accordance with a predetermined hard decision format.

14. The method of claim 13 wherein said step of generating a hard symbol estimate comprises a comparing said first symbol estimate to a set of threshold values.

15. The method of claim 13 wherein said step of generating a hard symbol estimate comprises Viterbi decoding said first symbol estimate.

16. The method of claim 13 wherein said step of de-spreading further comprises:
    generating a pseudo random sequence; and
    multiplying said filtered chip values by said pseudo random sequence to provide a product sequence.

17. The method of claim 11 further comprising updating said tap values in accordance with a least means square (LMS) tap adaptation format.

18. The method of claim 16 wherein said step of de-spreading further comprises integrating said product sequence to provide a de-spread sequence.

19. The method of claim 18 wherein said step of de-spreading further comprises mapping said de-spread sequence to a second sequence according to a predetermined mapping format.

20. The method of claim 19 wherein said mapping format is a Hadamard transform.

21. An adaptive despreader comprising:

transversal filter having a first input for receiving input samples and having a second input for receiving tap update values and having an output;

error calculator having an input coupled to said transversal filter output and having an output for providing a spread spectrum calculated error signal; and tap update calculator having a first input coupled to said error calculator output and having an output coupled to said second transversal filter input.

22. The apparatus of claim 21 wherein said error calculator comprises:

symbol estimator having an input and an output;

decision circuit having an input coupled to said symbol estimator output; and subtractor having a first input coupled to said symbol estimator output and a second input coupled to said decision circuit output and having an output.

23. The apparatus of claim 22 wherein said error calculator further comprises a despreader having an input coupled to said transversal filter output coupled to said symbol estimator input.

* * * * *